United States Patent
Jansen et al.

(10) Patent No.: US 12,013,820 B1
(45) Date of Patent: Jun. 18, 2024

(54) DYNAMICALLY CHANGING JOURNALING TYPES FOR FILES IN A DISTRIBUTED FILE SYSTEM

(71) Applicant: Amazon Technologies, Inc., Seattle, WA (US)

(72) Inventors: Gerardus Theodorus Jansen, Arlington, MA (US); Neal Charbonneau, Medford, MA (US); Jacob A Strauss, Sherborn, MA (US); Jacob Luszcz, Boston, MA (US); Akshay Kumar Saxena, Needham, MA (US); Mukarram Ahmad Tahir, Cambridge, MA (US); Rahul Shah, Andover, MA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/033,205

(22) Filed: Sep. 25, 2020

(51) Int. Cl.
*G06F 16/182* (2019.01)

(52) U.S. Cl.
CPC ................... *G06F 16/182* (2019.01)

(58) Field of Classification Search
CPC ...................................... G06F 16/182
USPC ......................................... 709/825
See application file for complete search history.

(56) References Cited

U.S. PATENT DOCUMENTS

| | | | |
|---|---|---|---|
| 8,392,479 B1* | 3/2013 | Pantin | G06F 16/182 707/823 |
| 10,303,663 B1* | 5/2019 | Kinney, Jr. | G06F 16/1873 |
| 10,599,637 B2 | 3/2020 | Marcotte | |
| 2005/0071593 A1 | 3/2005 | Vincent | |
| 2009/0240744 A1* | 9/2009 | Thomson | G06F 16/2358 |
| 2015/0356112 A1* | 12/2015 | Lee | G06F 16/178 707/625 |
| 2016/0232016 A1* | 8/2016 | Pease | G06F 3/0674 |
| 2017/0277715 A1* | 9/2017 | Strauss | G06F 16/1865 |
| 2017/0357656 A1 | 12/2017 | Gates | |
| 2019/0146672 A1* | 5/2019 | Ben Dayan | G06F 11/108 711/154 |
| 2019/0155792 A1* | 5/2019 | Jeong | G06F 9/544 |
| 2020/0201826 A1* | 6/2020 | Raju | G06F 16/1774 |

OTHER PUBLICATIONS

Optimizing File Systems with a Write-Efficient Journaling Scheme on Non-Volatile Memory, IEEE Publication, Year 2019, vol. 68, Issue 3, Date of Publication: Sep. 13, 2018.*

* cited by examiner

*Primary Examiner* — Jeffrey R Swearingen
(74) *Attorney, Agent, or Firm* — S. Scott Foster; Kowert, Hood, Munyon, Rankin & Goetzel, P.C.

(57) ABSTRACT

Journaling for files in a distributed file system may be dynamically changed. A write request for a file in a distributed file system may be received. An evaluation of the file may be performed with respect to a journaling type change criteria. If the evaluating indicates a change to journaling type, then the write request may be performed according to a different type of journaling than was applied to prior write request. If the evaluating does not indicate a change, then a current journaling type may be applied to perform the write request.

20 Claims, 8 Drawing Sheets

DYNAMICALLY CHANGING JOURNALING TYPES FOR FILES IN A DISTRIBUTED FILE SYSTEM

BACKGROUND

Distributed file systems support data storage and access for multiple clients over a network. For cloud services or other provider networks, distributed file systems can enhance the capabilities of clients to implement diverse and dynamic applications. Because different types of applications may utilize data differently, some application workloads may be better suited to different implementations of distributed file systems.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for dynamically changing journaling types for files in a distributed file system are described herein. Different workloads for different clients of a file system may have different performance goals. For example, for some clients minimizing latency to access files may be more beneficial for application performance than, for instance, achieving high throughput to files. Instead of statically defining a single technique for handling workloads for different client applications for a distributed file system, changing techniques, such as dynamically changing journaling types for files, may provide an adaptable and performant way to manage a distributed file system on behalf of a client to achieve better performance according to the actual workload of a file in the distributed file system. For example, journaling techniques may lower latency of write requests to a file in a distributed file system at the expense of decreasing throughput performance, as writes may have to be twice written (e.g., first to a journal and second to a separate storage location, such as data block allocated for the write). However, by dynamically changing journaling types for files, a file that may initially appear to benefit from one type of journaling technique can change to a different journaling type when a criteria indicates that a change to the different journaling type may be beneficial.

Figure 1:
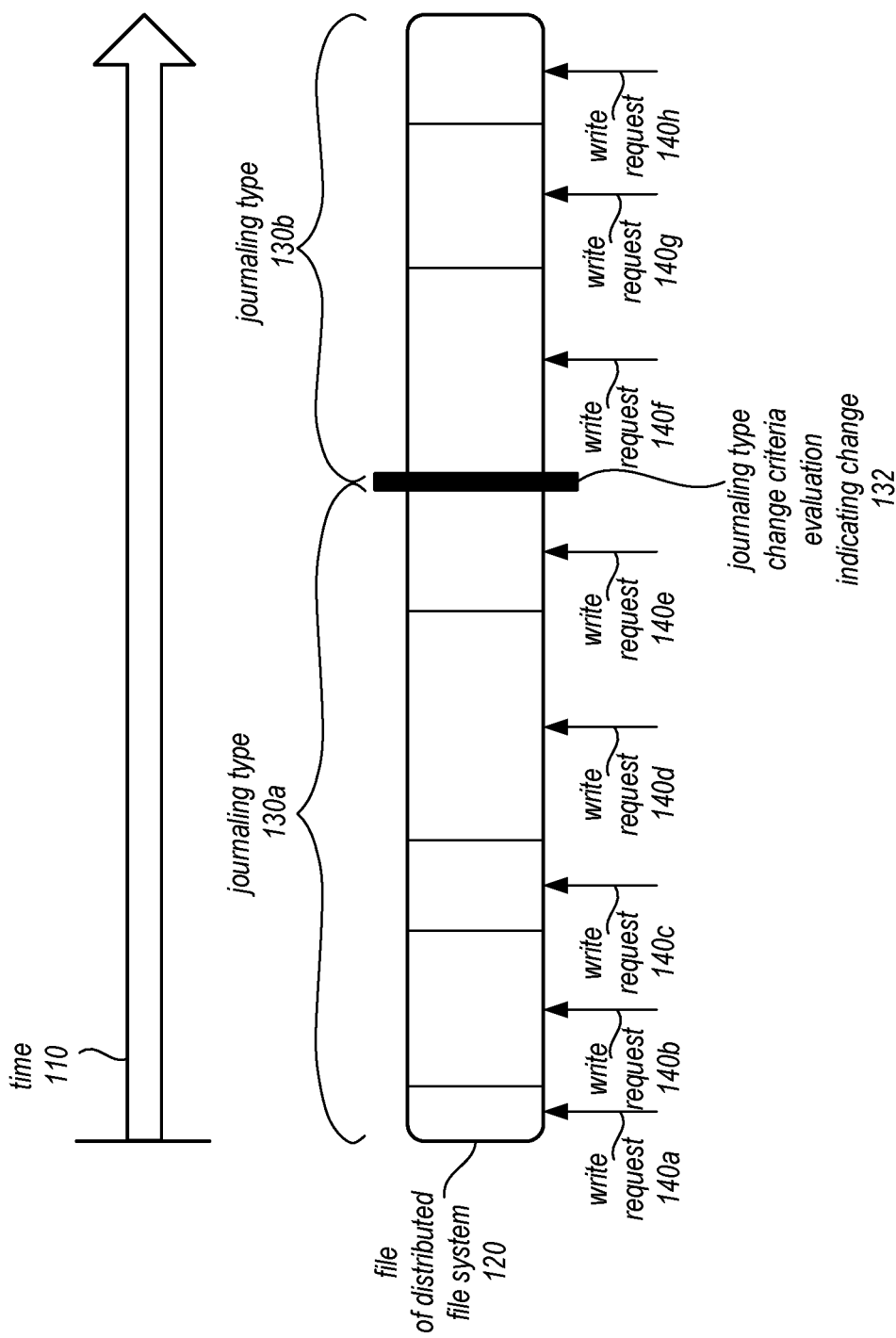
FIG. 1 illustrates a logical block diagram of dynamically changing journaling types for files in a distributed file system, according to some embodiments.

FIG. 1 illustrates a logical block diagram of dynamically changing journaling types for files in a distributed file system, according to some embodiments. File 120 may be a file stored as part of a distributed file system, in some embodiments. A distributed file system may provide block-level access to data to one or multiple different clients over a network using similar or the same interfaces (or other operational semantics) used for local, non-distributed files systems (e.g., techniques to mount file systems, view hierarchy information of the file system, read or write at by boundaries, apply various permission or other access controls, among others), in various embodiments.

As discussed above, the workload of a file may change over time, as indicated by timeline 110 in FIG. 1. Different write requests to file 120 may indicate the usage, and thus the beneficial journaling type to be applied. For example, as discussed below with regard to FIGS. 5 and 6, different journaling type change criteria may be evaluated with respect to file 120 (e.g., such as a size-based or throughput threshold). As indicated at 132, an evaluation of the journaling type change criteria may indicate and trigger a change in journaling type. For example, journaling type 130a applied for a first period of time 110 (and writes 140a, 140b, 140c, 140d, and 140e) and may change to journaling type 130b for a later period of time 110 (and writes 140f, 140g, and 140h). Different types of journaling (including a no-journaling type) may be applied, in some embodiments. The criteria for changing journaling type may be predefined or dynamically determined, as discussed below with regard to FIG. 7.

In various embodiments, a change in journaling type may cause a change in handling of write requests. For example, write requests 140*a*-140*e* may be performed differently than write requests 140*f*-140*h*, even though the write requests are directed to the same file. In some embodiments, as discussed below with regard to FIG. 6, multiple journaling type changes can be performed, and in other embodiments, a one-way change (e.g., from metadata/payload journaling to metadata-only journaling) may be performed.

Various different types of systems and services that implemented distributed file systems, such as file system management service implemented as part of a provider network as discussed below with regard to FIG. 2 or other type of system that implements or uses a distributed file system may implement dynamically changing journaling types for files. The previous description of dynamically changing journaling types for files in a distributed file system in FIG. 1 is a logical illustration and thus is not to be construed as limiting as to the specific system for implementing dynamically changing journaling types for files in a distributed file system.

This specification begins with a general description of a provider network that implements a file system management service that implements dynamically changing journaling types for files in a distributed file system hosted by the file system management service. Then various examples of the file system management service including different components/modules, or arrangements of components/module that may be employed as part of implementing the file system management service are discussed. A number of different methods and techniques to implement dynamically changing journaling types for files in a distributed file system are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
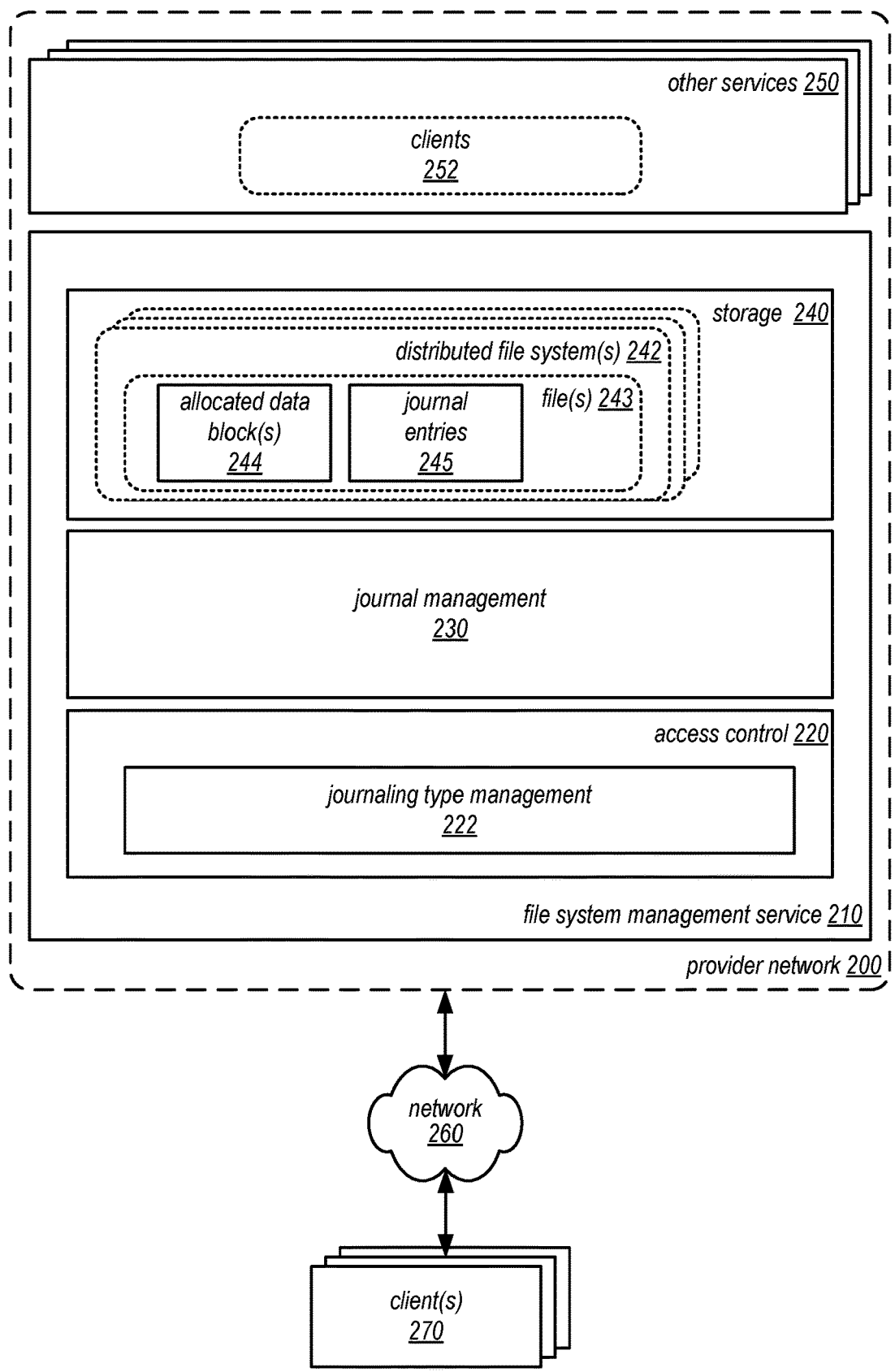
FIG. 2 is a logical block diagram illustrating a provider network implementing a file system service that implements dynamically changing journaling types for files in a distributed file system hosted in the file system service, according to some embodiments.

FIG. 2 is a logical block diagram illustrating a provider network implementing a file system service that implements dynamically changing journaling types for files in a distributed file system hosted in the file system service, according to some embodiments. In various embodiments, a provider network, such as provider network 200, may be a private or closed system or may be set up by an entity such as a company or a public sector organization to provide one or more services (such as various types of cloud-based storage, processing, or other computing resources) accessible via the Internet and/or other networks to clients 270. The provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to user commands. These resources can be dynamically provisioned and reconfigured to adjust to variable load, providing a fully-managed service and/or server-less experience for users.

In various embodiments, provider network 200 can be formed as a number of regions, where a region may be a separate geographical area in which the provider network clusters or manages data centers, in some embodiments. Each region may include two or more availability zones (sometimes referred to as fault tolerant zones) connected to one another via a private high speed network, for example a fiber communication connection. An availability zone (also known as an availability domain, or simply a "zone") may refer to an isolated failure domain including one or more data center facilities with separate power, separate networking, and separate cooling from those in another availability zone, in some embodiments. Preferably, availability zones within a region are positioned far enough away from one another that the same natural disaster should not take more than one availability zone offline at the same time, in some embodiments. Clients 270 can connect to availability zones of the provider network 200 via a publicly accessible network (e.g., the Internet, a cellular communication network).

Regions may be connected to a global network which includes private networking infrastructure (e.g., fiber connections controlled by the cloud provider) connecting each region to at least one other region, in some embodiments. The provider network 200 may deliver content from points of presence outside of, but networked with, these regions by way of edge locations and regional edge cache servers, in some embodiments. This compartmentalization and geographic distribution of computing hardware enables the provider network to provide low-latency resource access to users on a global scale with a high degree of fault tolerance and stability.

In some embodiments, provider network 200 may implement various computing resources or services across one or more regions, such as file system management service 210 and other services 250, which may include a virtual compute service, data processing service(s) (e.g., map reduce, data flow, and/or other large scale data processing techniques), data storage services (e.g., object storage services, block-based storage services, various types of database services (e.g., SQL, NoSQL, document, graph, time series, and so on), blob storage, or data warehouse storage services) and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 illustrated in FIG. 8 and described below. In various embodiments, the functionality of a given system or service component (e.g., a component of identity and access management services 210 or other services 250) may be implemented by a particular node or may be distributed across several nodes. In some embodiments, a given node may implement the functionality of more than one service system component (e.g., more than one data store component).

File system management service 210 may provide a scalable, fully managed, elastic file system for use with external clients 270 or internal clients 252 of provider network 200, in various embodiments. In various embodiments, file system management service 210 may provide a distributed file system that scales on demand as files are added or removed by client applications. In various embodiments, file system management service 210 may provide different types of storage classes for different types of application workloads, such as infrequently accessed files. In various embodiments, file system management service 210 may provide support for parallel shared access to clients (e.g., across large numbers of clients 252 and/or 270) in order to achieve high level aggregate throughput and Input/Output Operations Per Second (IOPS).

In various embodiments, file system management service 210 may implement multiple different tiers for hosting distributed file systems, like distributed file systems 242. For example, in at least some embodiments, file system management service 210 may implement access control 220, which may be implemented across one or more nodes to handle various access requests on behalf of clients. Access control 220 may implement request routing to route access requests to other tiers for handling, as discussed in detail below with regard to FIGS. 3 and 4. For example, access control 220 may route read requests for application data to storage 240 (e.g., to one or more storage nodes) in order to read from a file 243. Access control 220 may implement or support various protocols or interfaces, such as Portable Operating System Interface (POSIX)-compliant controls, for external clients 270 and/or internal clients 252, such as by providing a file permissions model, file locking capabilities, hierarchical directory structures and various types of virtual private (e.g., VPN) or other secure connections. Access control 220 may support requests to create a file system in response to a client request and dynamically add the storage capacity (e.g., by allocating or assigning data blocks in storage 240 when files are added, without the need for a client application to provision storage in advance). In at least some embodiments, file system management service 210 may implement journaling type management which determine, select, and/or change journaling types for files 243 in distributed files systems 242 according to the various techniques discussed below with regard to FIGS. 3-7.

In various embodiments, file system management service 210 may implement journal management 230, which may handle different types of journaling techniques selected or determined by access control 220. For example, for metadata-only journaling types, journal management 220 may handle separate requests to write to journal entries for block allocation and file attributes, as discussed below with regard to FIG. 4, in some embodiments. For metadata/payload journaling techniques, journal management 230 may handle requests to include in a same journal entry, a block allocation for the write request payload, the write request payload, and file attributes, as discussed below with regard to FIG. 3, in some embodiments. In some embodiments, journal management 230 may be implemented as separate respective processes on a same set of resources (e.g., nodes) as access control 220, and in other embodiments, may be implemented on separate resources.

In various embodiments, file system management service 210 may implement storage 240. Storage tier 240 may be implemented by a plurality of storage nodes that act as a persistent, block-based data store for hosted distributed files systems 242 and file(s) 243 therein. For example, storage 240 may store both journal entries 245 for a file 243 and separately the data in allocated blocks 244 for the file. Storage 240 may provide multi-tenant storage, in various embodiments, and may distribute data for a same file 243 or distributed file system 242 across multiple, physical storage nodes (e.g., according to various striping or sharding techniques). Storage tier 240 may be distributed across multiple availability zones and may store multiple copies of file 243 and distributed file system 242 data in order to provide high data availability and reliability.

Clients 270 may encompass any type of client configurable to submit network-based requests to provider network 200 via network 260, including requests to file system management service 210 (e.g., a request to create a file, access a file (e.g., write or read to a file), or other file system operation). For example, a given client 270 may include a suitable version of a web browser, or may include a plug-in module or other type of code module configured to access a management console to configure a distributed file system 242 to be hosted in file system management service 210 or maybe a client application that utilizes a hosted distributed file system 242. In some embodiments, a client application may include sufficient protocol support (e.g., for a suitable version of file system protocols, such as Network File System (NFS) or other network-based file system protocols, interfaces, or communication techniques for generating and processing network-based services requests. In various embodiments, client 270 may be an application configured to interact directly with provider network 200. In some embodiments, client 270 may be configured to generate network-based services requests according to a Representational State Transfer (REST)-style network-based services architecture, a document- or message-based network-based services architecture, or another suitable network-based services architecture. Although clients 270 are illustrated as external to provider network 200, in some embodiments clients of different services, like other services 250, can be implemented within provider network 200 (e.g., implemented on a resource of another service 250, such as virtual compute instance, like clients 252).

Clients 270 may convey network-based services requests to and receive responses from provider network 200 via network 260. In various embodiments, network 260 may encompass any suitable combination of networking hardware and protocols necessary to establish network-based-based communications between clients 270 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients may communicate with provider network 200 using a private network rather than the public Internet.

Figure 3:
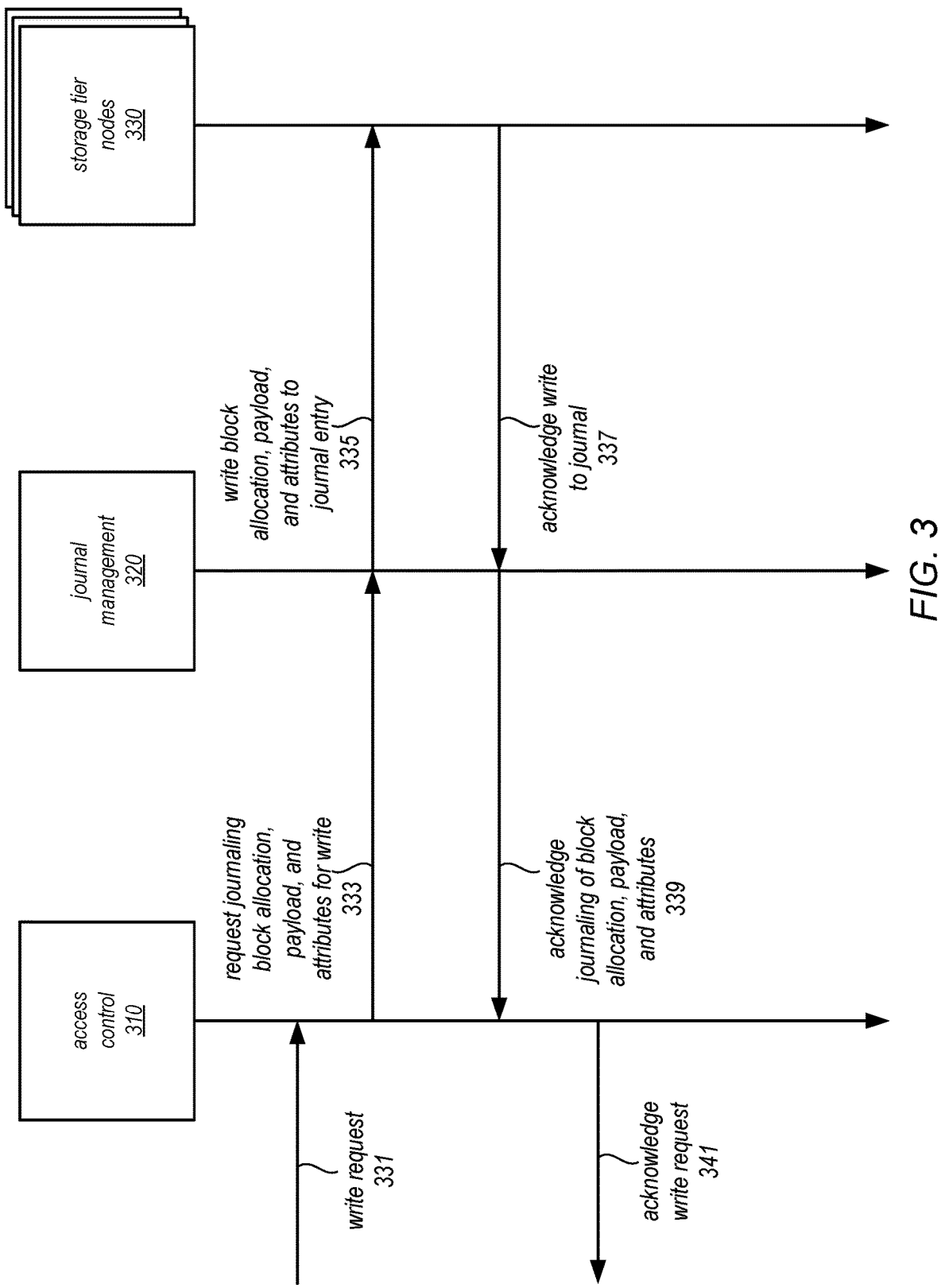
FIG. 3 is a logical block diagram illustrating interactions to perform journaling for a file system according to a journaling type that journals both metadata and payload of a write request, according to some embodiments.

FIG. 3 is a logical block diagram illustrating interactions to perform journaling for a file system according to a journaling type that journals both metadata and payload of a write request, according to some embodiments. Access control 310, which may be one or more components (e.g., nodes) that implement access control 220 discussed above with regard to FIG. 2, may receive a write request 331 from a client directed to a file in a hosted distributed file system. Access control 310 may perform various identity, authorization, or other permission checks and translate (in some embodiments) the write request to a different protocol or API for handling within file system management service 210, in some embodiments. Access control 310 may determine or select which type of journaling is to be performed for the write request, according to the techniques discussed above, as well as those discussed below with regard to FIGS. 5-7.

Access control 310 may determine a metadata/payload journaling type for the write request. To perform the write request with metadata/payload journaling, access control 310 may perform and/or send a request to journal the block allocation for the write, the payload of the write, and attribute(s) (or changes to attributes) (e.g., changes to inode information) for the write, as indicated at 333, to journal management 320. For example, journal management 320 may support performing these operations transactionally, as part of a single request to be completed together.

Journal management 320 (which may be similar to journal management 230 as discussed above with regard to FIG. 2) may specify the updates to block allocation (e.g., to a block allocation map), the payload data of the write itself and the attributes to a single journal entry, as indicated at 335. This write 335 may be performed to multiple locations in a distributed file system, to multiple storage tier nodes 330 (e.g., distributed across different availability zones), which may be implemented as part of storage tier 240 discussed above with regard to FIG. 2, in some embodiments. Separate responses, such as acknowledgement 337 may be received from storage tier nodes 330 to ensure that at least some (e.g., a quorum) or all storage tier nodes 330 have received and performed the write to the journal entry. In some embodiments, storage tier nodes 330 (or journal management 320) may perform various encodings (e.g., encryption and/or compression). In some embodiments, compression may be performed to reduce the size of the journal (and delay change to another journaling type).

When journal management 320 has received sufficient acknowledgements from storage tier nodes 330, journal management 320 may return an acknowledgement of the journal block allocation, payload, and attributes 339 to access control 310, which may acknowledge the write request to the client, as indicated at 341.

Figure 4:
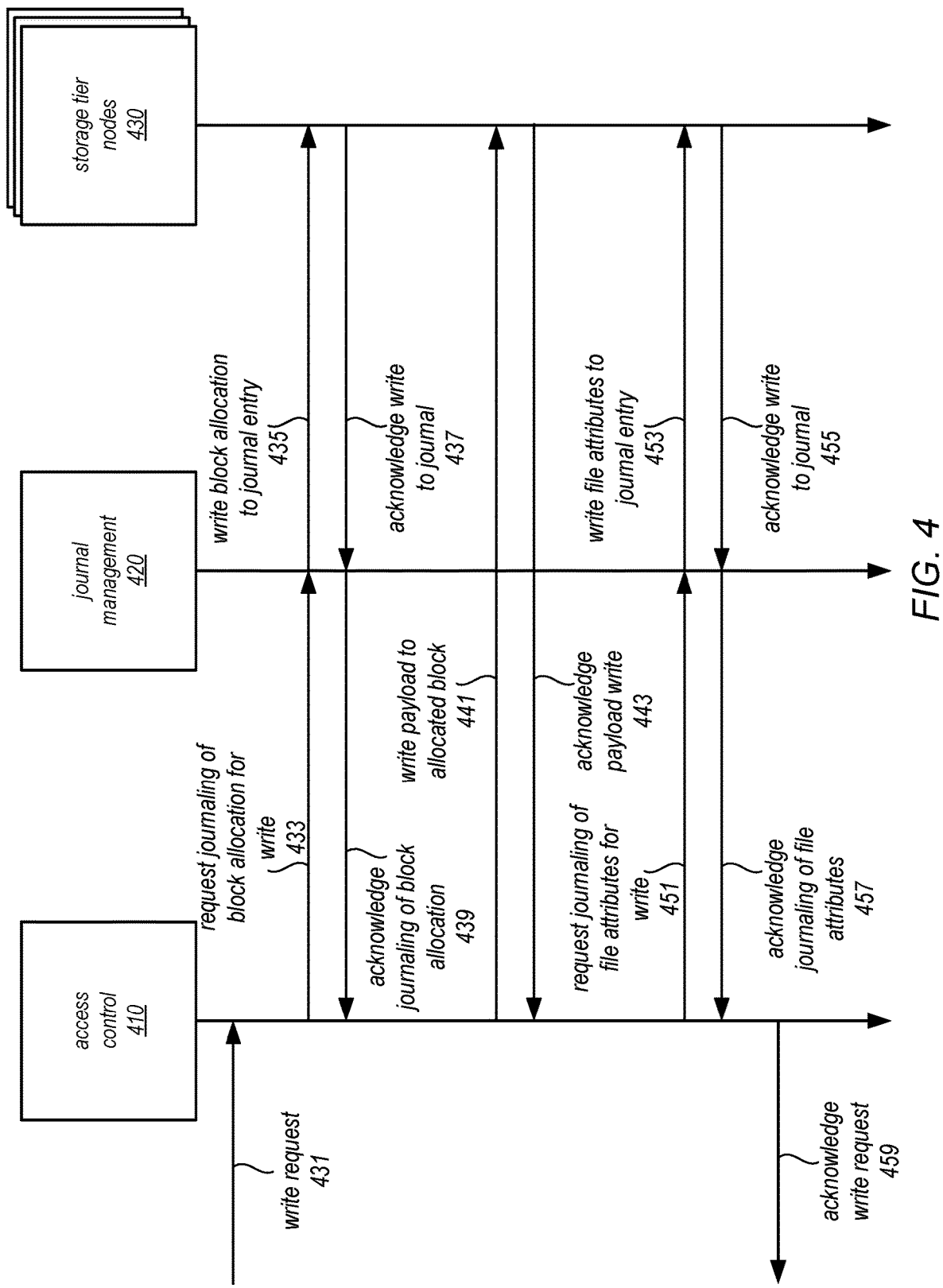
FIG. 4 is a logical block diagram illustrating interactions to perform journaling for a file system according to a journaling type that journals metadata of a write request and separately stores the payload of the write request, according to some embodiments.

FIG. 4 is a logical block diagram illustrating interactions to perform journaling for a file system according to a journaling type that journals metadata of a write request and separately stores the payload of the write request, according to some embodiments. Access control 410, which may be one or more components (e.g., nodes) that implement access control 220 discussed above with regard to FIG. 2, may receive a write request 431 from a client directed to a file in a hosted distributed file system. Access control 410 may perform various identity, authorization, or other permission checks and translate (in some embodiments) the write request to a different protocol or API for handling within file system management service 210, in some embodiments. Access control 410 may determine or select which type of journaling is to be performed for the write request, according to the techniques discussed above, as well as those discussed below with regard to FIGS. 5-7.

Access control 410 may determine a metadata-only journaling type for the write request. In contrast with the metadata/payload journaling type discussed above with regard to FIG. 3, multiple separate requests may be performed from access control 410 in order to complete the write request. For example, access control 410 may send a request to journal a block allocation for the write 433 to journal management 420 (which may be similar to journal management 230 discussed above with regard to FIG. 2). Journal management 420 may in turn send a request to write block allocation to a journal entry for the file at storage nodes 430 (which may be implemented as part of storage 240 discussed above with regard to FIG. 2). Similar to FIG. 3 above, storage tier nodes 430 may be distributed and separate responses, such as acknowledgement 437 may be received from storage tier nodes 430 to ensure that at least some (e.g., a quorum) or all storage tier nodes 430 have received and performed the write to the journal entry. In some embodiments, storage tier nodes 430 (or journal management 420) may perform various encodings (e.g., encryption and/or compression). In some embodiments, compression may be performed to reduce the size of the journal (e.g., to delay change to another journaling type).

Access control 410 may send write requests to write the payload to allocated block, as indicated at 441, directly to storage tier nodes 430 (e.g., bypassing journal management 420). These writes may be performed in a data block allocated for the payload, which may be separate from the journal stored for the file (e.g., blocks formatted for file data (e.g., application data) different from blocks formatted for journal data (e.g., journal entries for metadata, such as block allocation and attributes). Similar to above, storage tier nodes 430 may be distributed and separate responses, such as acknowledgement 443 may be received from storage tier nodes 430 to ensure that at least some (e.g., a quorum) or all storage tier nodes 430 have received and performed the write to the data block. In some embodiments, storage tier nodes 430 (or access control 410) may perform various encodings (e.g., encryption and/or compression).

Access control 410 may send write requests to journal the file attributes in the journal for the file, as indicated at 451, to journal management 420. Journal management 420 may perform a write 453 of file attributes to a journal entry (which may be the same as the journal entry for the block allocation). Similar to above, storage tier nodes 430 may be distributed and separate responses, such as acknowledgement 455 may be received from storage tier nodes 430 to ensure that at least some (e.g., a quorum) or all storage tier nodes 430 have received and performed the write to the journal entry. In some embodiments, storage tier nodes 430 (or journal management 420) may perform various encodings (e.g., encryption and/or compression). After receiving acknowledgement from journal management 420, as indicated at 452, access control 410 may acknowledge the write request, as indicated at 459.

Although FIGS. 2-4 have been described and illustrated in the context of a file system management service, the various techniques and components illustrated and described in FIGS. 2-4 may be easily applied to other file system managers for distributed file systems. As such, FIGS. 2-4 are not intended to be limiting as to other embodiments of a system that may implement dynamically journaling types for files in a distributed file system.

Various different systems and devices may implement the various methods and techniques described below, either singly or working together. For example, a file system management service such as described above with regard to FIGS. 2-4 may be configured to implement the various methods. Therefore, the above examples and or any other systems or devices referenced as performing the illustrated method, are not intended to be limiting as to other different components, modules, systems, or configurations of systems and devices.

Figure 5:
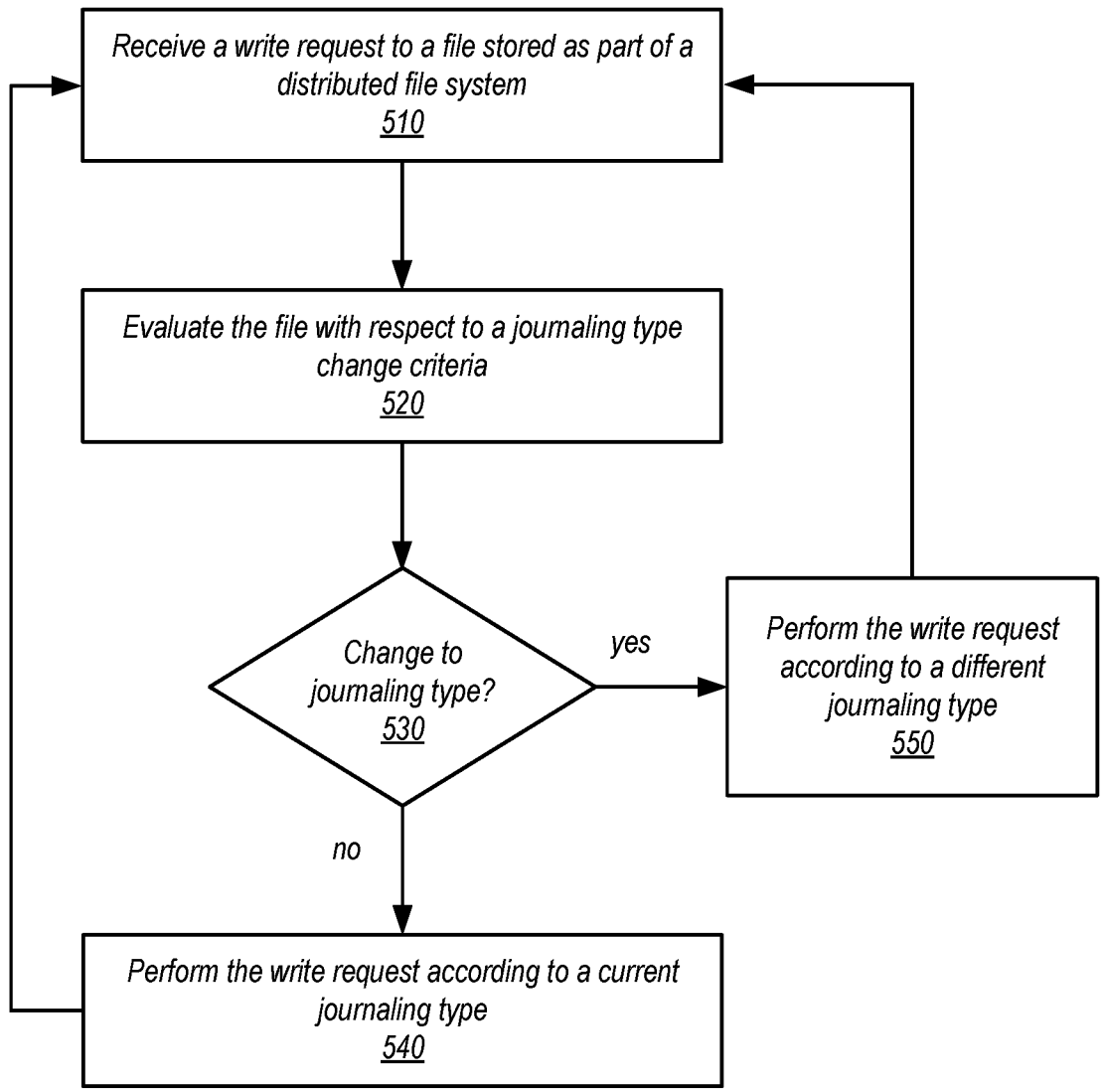
FIG. 5 is a high-level flowchart illustrating various methods and techniques to implement dynamically changing journaling types for files in a distributed file system, according to some embodiments.

FIG. 5 is a high-level flowchart illustrating various methods and techniques to implement dynamically changing journaling types for files in a distributed file system, according to some embodiments. As indicated at 510, a write request may be received to a file stored as part of a distributed file system, in some embodiments. For example, the write request may be received from a client that has mounted the distributed file system that includes the file. In some embodiments, the client may be the client that created the file (and/or file system) and may have specified the enforcement of a journaling type change criteria with respect to the file. The write request may be formatted according to various to types of network-based file system protocols, APIs, or other interfaces, such as Network File System (NFS). In some embodiments, the file may have been manually enabled (e.g., by client request, parameter or other designation) for dynamic journaling type changes (e.g., as part of a request to create the file or as part of a system or service parameter for the distributed file system). Other files may, in some embodiments, by excluded from changing journaling types (e.g., by client request, parameter, or other designation to disable changing journaling types).

As indicated at 520, the file may be evaluated with respect to a journaling type change criteria, in some embodiments. For example, a current journaling type may have a corresponding change criteria for one (or more) other journaling types. T change to a metadata-only journaling type from a metadata/payload journaling type, for instance, a specific size or throughput threshold may be specified. In some embodiments, to change from a metadata-only journaling type to a metadata/payload journaling type, a frequency of writes and/or average size of writes may be evaluated.

As indicated at 530, a change to journaling type may be triggered or otherwise indicated by the evaluation, in some embodiments. If no change, then as indicated at 540, the write request may be performed according to a current journaling type, in various embodiments. If a change is indicated, then the write request may be performed according to a different journaling type, as indicated at 550, in various embodiments. In some embodiments, changes to journaling type may include other operations in addition to a change in the performance of a write. For example, a change from metadata-only to metadata/payload journaling may include recreating or moving data received from previous writes to the file into the journal (or in other cases may include updating file attributes or other metadata to indicate how to access (e.g., read) the file given the change in journaling type.

As indicated by the loop-back arrows from 540 and 550 to 510 respectively, journaling type changes may occur over time or may be considered for each write request, in some embodiments. In other embodiments, a common progression of journaling types may be applied so that a file cannot go back once a prior journaling type has been changed (e.g., go back from metadata-only journaling to metadata/payload journaling). In some embodiments, parallel access to a file may allow for multiple writes (or other access operations, such as reads) to a file to be performed in parallel (or in overlapping time periods). In such embodiments, write requests may still be individually evaluated to see if a change to journaling type should be performed, which may affect the subsequent performance of write requests received from other clients which may be performed using the different journaling type.

In some embodiments, dynamic journaling techniques may be limited to certain files in a file system (though such limitations may not be applied in other embodiments). For example, in some embodiments, only newly created files after journaling type changes have been enabled, implemented, or otherwise deployed may be eligible to be evaluated and possibly changed. In some embodiments, existing files can be considered for a journaling type change (e.g., from currently metadata-only journaling to metadata/payload journaling). In some embodiments, various hints, parameters, or other settings may be specified by a client to configure the application of dynamic journaling techniques to individual files in a distributed file system or to the distributed files system (or portion thereof, such as directory), as a whole.

Figure 6:
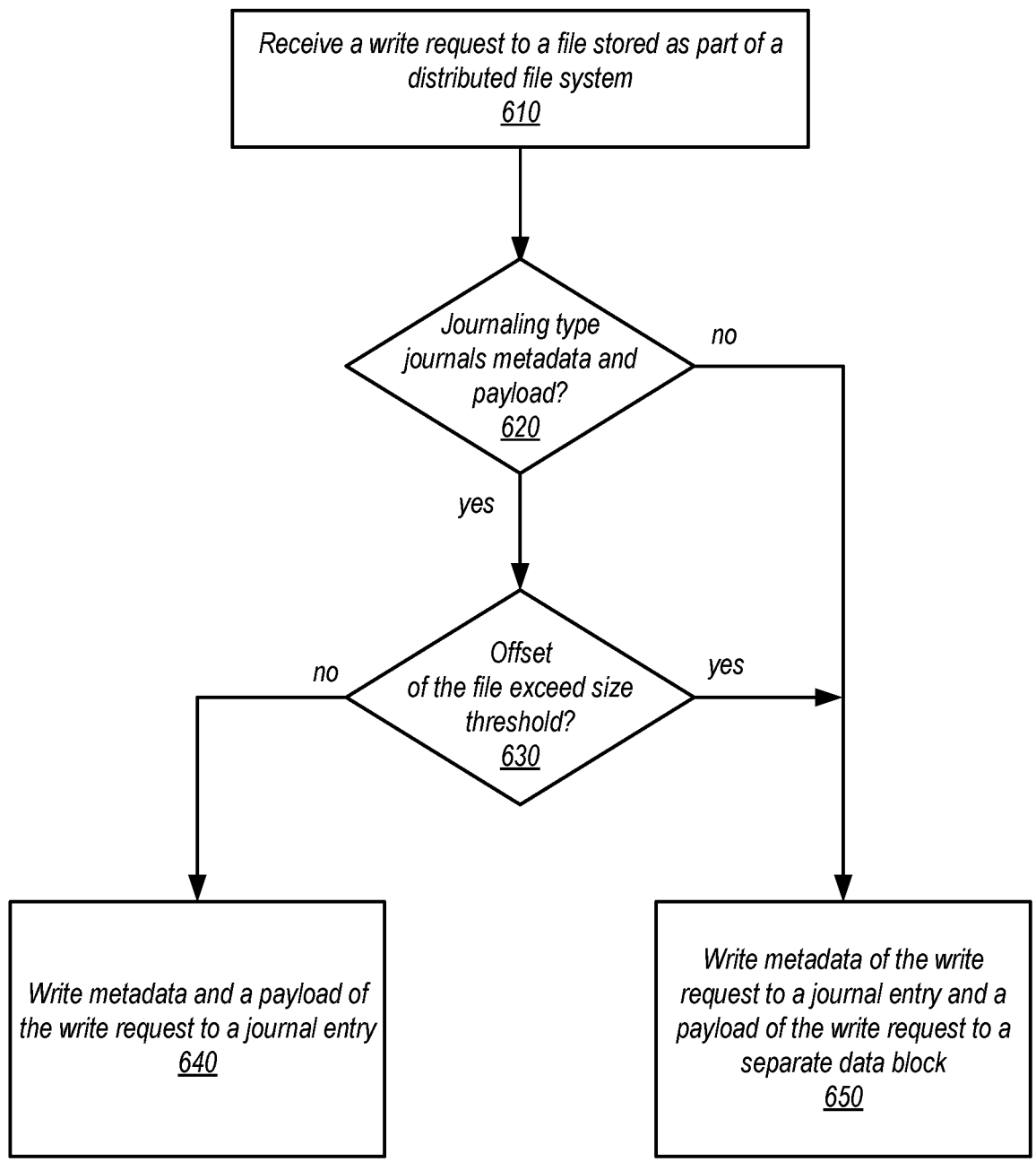
FIG. 6 is a high-level flowchart illustrating various methods and techniques to implement changing a storage location of write request payload according to a journaling type selected for a file, according to some embodiments.

As discussed above with regard to FIGS. 3 and 4, some changes between journaling types may include changes to a storage location for a payload of data received as part of a write request. FIG. 6 is a high-level flowchart illustrating various methods and techniques to implement changing a storage location of write request payload according to a journaling type selected for a file, according to some embodiments. As indicated at 610, a write request to a file stored as part of a distributed file system may be received, in some embodiments. For example, as discussed above, the write request may be received from a client that has mounted the distributed file system that includes the file. In some embodiments, the client may be the client to create the file and may have specified the enforcement of a journaling type change criteria with respect to the file. The write request may be formatted according to various to types of network-based file system protocols, APIs, or other interfaces, such as NFS.

As indicated at 620, a determination may be made as to whether a current journaling type for the file journals metadata and payload together for write requests. For example, a file attribute or other file system information may be maintained that indicates the journaling type for the file, which may be checked. As indicated by the negative exit from 620, if not, then a journaling type that writes the metadata of the write request to a journal entry and a payload of the write request to a separate data block may be performed, as indicated at 650. If, as indicated by the positive exit from 620, that the current journaling type journals the metadata and the payload, then the file may be eligible for a change in journaling type. For instance, in some embodiments, change in journaling type may be a one-way or one-time change (e.g., from journaling both metadata and payload to journaling metadata alone). In other embodiments, such as those discussed above with regard to FIG. 5, multiple journaling type changes could be performed.

As indicated at 630, a size of an offset of the file may be evaluated with respect to a size threshold, in various embodiments. The size threshold may be one example of a journaling type change criteria. For instance, a size threshold may be specified in as a pre-defined size threshold or be dynamically determined specifically for the file (e.g., according to the techniques discussed below with regard to FIG. 7), in some embodiments. In some embodiments, compression techniques may be applied (e.g., to the offset of journal entries for the file) in order increase the number of journal entries that can be written before the size threshold is exceeded.

If the size threshold is not exceeded, then the journaling type may remain unchanged for the write, and as indicated by the negative exit from 630. For instance, the metadata and the payload may be written to a journal entry, as indicated at 640. If the size threshold is exceeded, then a journaling type change may be triggered, that writes the metadata of the write request to a journal entry and a payload of the write request to a separate data block may be performed, as indicated at 650.

Figure 7:
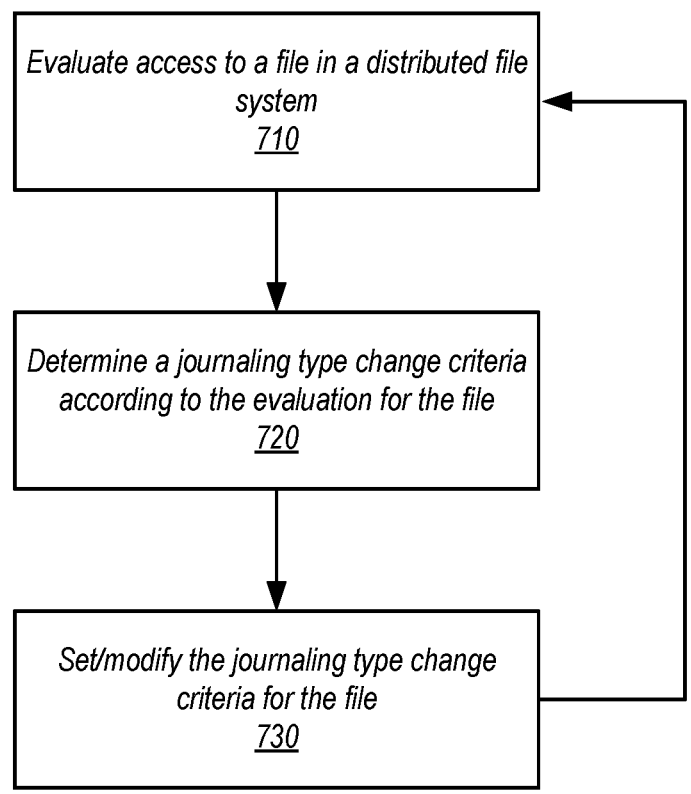
FIG. 7 is a high-level flowchart illustrating various methods and techniques to implement determining change criteria for changing journaling types for a file in a distributed file system, according to some embodiments.

While some journaling type change criteria may indicate when beneficial changes to journaling type can be performed for some files in a distributed file system, other files may benefit from utilizing a customized or dynamically determined journaling type change criteria, in some embodiments. For instance, an expected usage of a file in distributed system may not match the actual usage of the file, such that a different than expected journaling type change may be better for determining when to change journaling types. FIG. 7 is a high-level flowchart illustrating various methods and techniques to implement determining change criteria for changing journaling types for a file in a distributed file system, according to some embodiments.

As indicated at 710, access to a file in a distributed system may be evaluated, according to some embodiments. For example, the frequency of writes to the file can be measure, indicating that the file is a high-throughput type of file. In another example, the average size of writes to the file can be determined, indicating whether the file would benefit from low latency offered by a journaling type. As indicated at 720, a journaling type change criteria may be determined according to the evaluation of the access for the file, in some embodiments. For example, a pre-defined or standard journaling type change criteria (e.g., a pre-defined size threshold or throughput threshold) may be increased or decreased according to the evaluation. In this way, a change in journaling type triggered by the journaling type change criteria may be hastened or otherwise detected sooner (or immediately) or may be slowed or otherwise detected later (or possibly never). For instance, a high-throughput file type may be sooner (or immediately) designated for moving to a non-payload type of journaling, as discussed above with regard to FIG. 4, in order to increase throughput capacity. In at least some embodiments, the determined change may trigger the change of journaling type immediately (e.g., a file may be marked, identified, or otherwise changed for journaling type for the next received write request (or any other access request). In some embodiments, a file may be marked, identified, or otherwise designated (e.g., by client request, parameter or setting) for dynamic evaluation to determine the journaling type change criteria. In some embodiments, a file may be marked, identified, or otherwise designated to be excluded from evaluation (e.g., either to use the pre-defined journaling type change criteria or to not have a change to journaling type made for the file at all).

As indicated at 730, the determined journaling type change criteria may be set (if not initially determined) or modified (e.g., from an earlier or pre-defined journaling type change criteria), in some embodiments. For example, a journaling type attribute or other feature of file system metadata may be updated to set/modify the determined journaling type change criteria, in order to be applicable for the file going forward. In some embodiments, the determined journaling type change criteria may be used as a new pre-defined journaling type change criteria for other files going forward.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
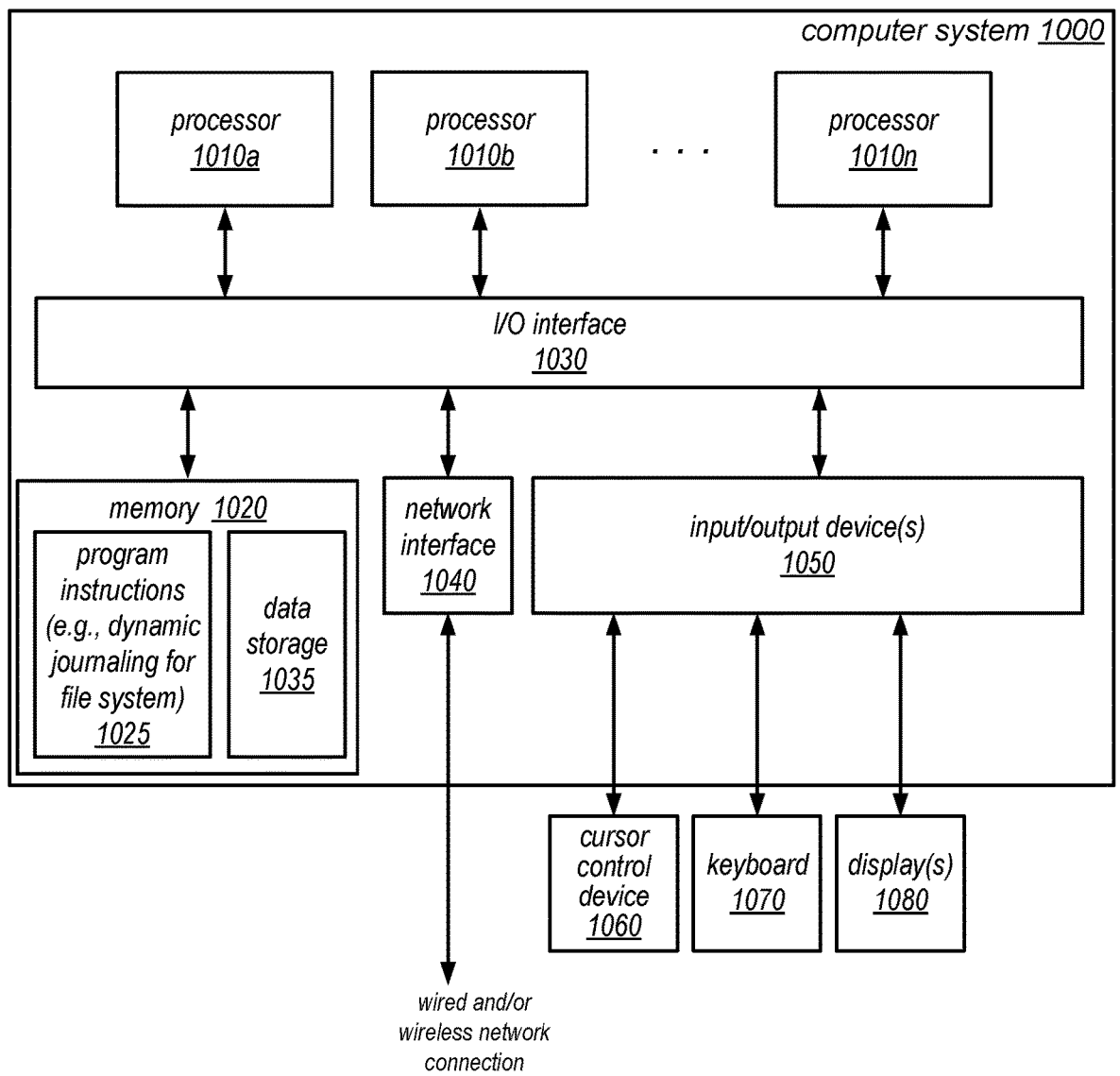
FIG. 8 illustrates an example system configured to implement the various methods, techniques, and systems described herein, according to some embodiments.

Embodiments of dynamically changing journaling types for files in a distributed file system as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., dynamically changing journaling types for files in a distributed file system) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement the various methods and techniques as described herein, including various techniques to implement dynamically journaling types for files in a distributed file system and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  at least one processor; and
  a memory, storing program instructions that when executed by the at least one processor, cause the at least one processor to:
    receive a new write request to a file stored as part of a distributed file system;
    evaluate the file with respect to a journaling type change criteria to determine a change from a first journaling type selected to perform a prior write request to the file to a second journaling type to perform the new write request;
    identify the file as stored using the second journaling type; and
    perform the new write to the file in the distributed file system according to the second journaling type, wherein the second journaling type changes a storage location for a payload of the new write request to the file, and wherein the storage location used to store payloads of write requests to the file is changed from a first storage location that was previously used to store a prior payload of a prior write request to the file to a second storage location used to store the payload of the new write request to the same file based on the change from the first journaling type to the second journaling type.

2. The system of claim 1, wherein the first journaling type stores metadata for a given write request and a payload of the given write request in an entry in a journal for the file, and wherein the second journaling type stores metadata for the new write request in the journal for the file and the payload for the new write request in a data block allocated to the file separate from the journal for the file.

3. The system of claim 1, wherein the journaling type change criteria is a size threshold, and wherein the evaluation of the file determines that a size of an offset of the file exceeds the size threshold.

4. The system of claim 1, wherein the distributed file system is hosted as part of a file system management service offered by a provider network, wherein the at least one processor is implemented as part of an access tier for the file system service, and wherein the new write request is received from client of the file system management service that mounted the distributed file system.

5. A method, comprising:
  receiving a plurality of write requests to a file stored as part of a distributed file system; and
  performing individual ones of the plurality of write requests to the file in the file system according to a first journaling type until an evaluation of the file with respect to a journaling type change criteria causes a change to perform at least one of the plurality of write requests according to a second journaling type, wherein the second journaling type changes a storage location for a payload of the at least one write request to the file, and wherein the storage location used to store payloads of write requests to the file is changed from a first storage location that was previously used to store a prior payload of a prior write request to the file to a second storage location used to store the payload of the at least one write request to the same file based on the change from the first journaling type to the second journaling type.

6. The method of claim 5, wherein the journaling type change criteria is a size threshold, and wherein the evaluation of the file determines that a size of the file exceeds the size threshold.

7. The method of claim 5, further comprising:
evaluating access to the file in the distributed storage system; and
determining the journaling type change criteria according to the evaluation of the file.

8. The method of claim 7, further comprising modifying a prior journaling type change criteria for the file to the determined journaling type change criteria.

9. The method of claim 5, wherein the journaling type change criteria is a throughput threshold, and wherein the evaluation of the file determines that a throughput performance for the file exceeds the throughput threshold.

10. The method of claim 5, wherein evaluation of a second file in the distributed file system with respect to the journaling type change criteria is not enabled.

11. The method of claim 5, wherein the evaluation of the file with respect to the journaling type change criteria is enabled after performing a different one of the plurality write requests to the file.

12. The method of claim 5, wherein the first journaling type stores metadata for a given write request and a payload of the given write request in an entry in a journal for the file, and wherein the second journaling type stores metadata for the at least one write request in the journal for the file and the payload for the at least one write request in a data block allocated to the file separate from the journal for the file.

13. The method of claim 12, wherein the first journaling type compresses the metadata and the payload in the entry in the journal for the file.

14. One or more non-transitory, computer-readable storage media, storing program instructions that when executed on or across one or more computing devices cause the one or more computing devices to implement:
receiving a new write request to a file stored as part of a distributed file system;
changing from a first journaling type selected to perform a prior write request to the file to a second journaling type to perform the new write request in response to evaluating the file with respect to a journaling type change criteria; and
performing the new write request to the file in the distributed file system according to the second journaling type, wherein the second journaling type changes a storage location for a payload of the new write request to the file, and wherein the storage location used to store payloads of write requests to the file is changed from a first storage location that was previously used to store a prior payload of a prior write request to the file to a second storage location used to store the payload of the new write request to the same file based on the change from the first journaling type to the second journaling type.

15. The one or more non-transitory, computer-readable storage media of claim 14, wherein the first journaling type stores metadata for a given write request and a payload of the given write request in an entry in a journal for the file, and wherein the second journaling type stores metadata for the new write request in the journal for the file and the payload for the new write request in a data block allocated to the file separate from the journal for the file.

16. The one or more non-transitory, computer-readable storage media of claim 14, wherein the evaluation of the file with respect to the journaling type change criteria is enabled responsive to a request to create the file in the distributed file system.

17. The one or more non-transitory, computer-readable storage media of claim 14, wherein the journaling type change criteria is a size threshold, and wherein the evaluation of the file determines that a size of the file exceeds the size threshold.

18. The one or more non-transitory, computer-readable storage media of claim 14, storing further instructions that when executed by the one or more computing devices, cause the one or more computing devices to further implement:
evaluating access to the file in the distributed storage system; and
determining the journaling type change criteria according to the evaluation of the file.

19. The one or more non-transitory, computer-readable storage media of claim 14, storing further instructions that when executed by the one or more computing devices, cause the one or more computing devices to further implement:
setting an initial journaling type change criteria for the file to the determined journaling type change criteria.

20. The one or more non-transitory, computer-readable storage media of claim 14, wherein the distributed file system is hosted as part of a file system management service offered by a provider network, wherein the at least one processor is implemented as part of an access tier for the file system service, and wherein the new write request is received from client of the file system management service that mounted the distributed file system.

* * * * *